United States Patent [19]
Soltis et al.

[11] Patent Number: 4,999,776
[45] Date of Patent: Mar. 12, 1991

[54] METHOD AND APPARATUS FOR DETERMINING THE CENTER POSITION OF A VEHICULAR STEERING SYSTEM

[75] Inventors: Michael W. Soltis, Livonia; Sam M. Mackool, Berkley, both of Mich.

[73] Assignee: Ford Motor Company, Dearborn, Mich.

[21] Appl. No.: 443,974

[22] Filed: Nov. 30, 1989

[51] Int. Cl.$^5$ .............................................. B62D 15/00
[52] U.S. Cl. .................... 364/424.05; 180/79
[58] Field of Search ................ 364/424.05, 424.01; 180/140–142, 79.1; 280/94

[56] References Cited

U.S. PATENT DOCUMENTS

| | | | |
|---|---|---|---|
| 3,608,925 | 9/1971 | Murphy | 280/112.2 |
| 3,895,816 | 7/1975 | Takahashi et al. | 280/6.12 |
| 4,345,661 | 8/1982 | Nishikawa | 180/141 |
| 4,555,126 | 11/1985 | Ishimitsu et al. | 280/707 |
| 4,564,214 | 1/1986 | Tokunaga et al. | 280/707 |
| 4,621,833 | 11/1986 | Soltis | 280/707 |
| 4,722,545 | 2/1988 | Gretz et al. | 280/771 |
| 4,803,629 | 2/1989 | Noto et al. | 364/424.05 |
| 4,867,466 | 9/1989 | Soltis | 280/94 |
| 4,884,647 | 12/1989 | Mimaro et al. | 180/140 |
| 4,939,654 | 7/1990 | Konda et al. | 364/424.05 |
| 4,947,328 | 8/1990 | Sugasawa | 364/424.05 |

OTHER PUBLICATIONS

Society of Automotive Engineers (SAE) Technical Paper #870540, Feb. 23–27, 1987.

*Primary Examiner*—Thomas G. Black
*Attorney, Agent, or Firm*—Raymond L. Coppiellie; Roger L. May

[57] ABSTRACT

A method and apparatus for determining a center position of the vehicular steering system includes a steering sensor and a control unit. A variable threshold time strategy is employed with a fixed window of operation and a movable window of operation to determine a precise center for the steering system. As an option, the control algorithm may employ both a variable theshold time and a variable size for the movable window of operation.

29 Claims, 6 Drawing Sheets

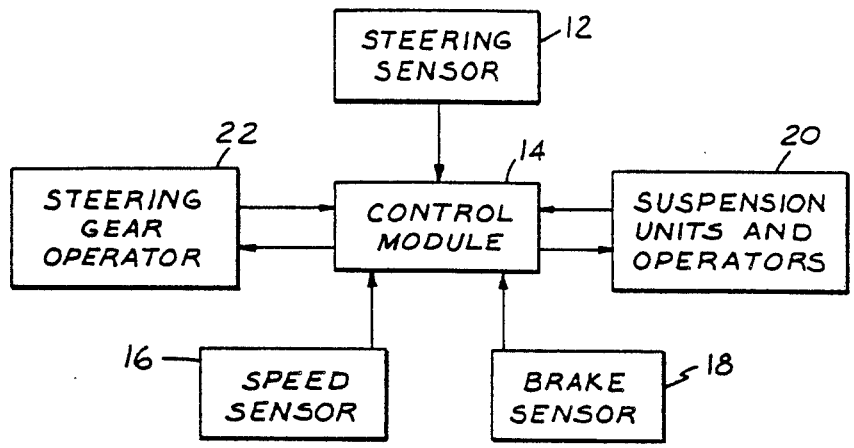
FIG.2
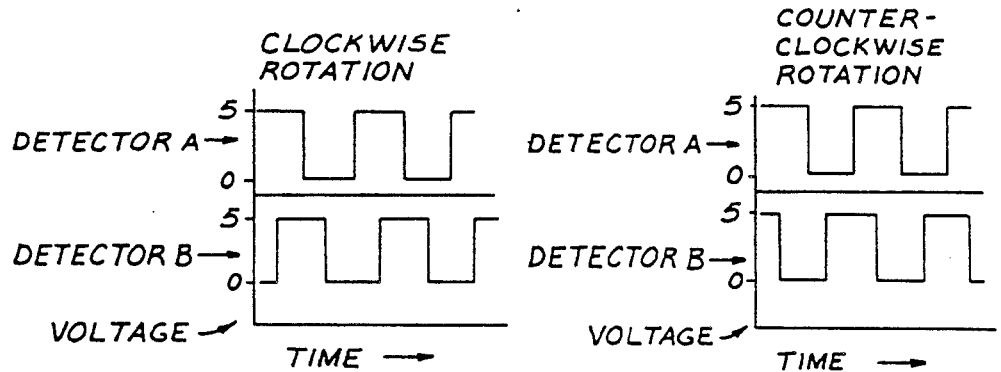
FIG.7A FIG.7B
|  | DETECTOR A | DETECTOR B |  |
|---|---|---|---|
|  | 0 | 0 |  |
| COUNTER-<br>CLOCKWISE<br>ROTATION | 1 | 0 | CLOCKWISE<br>ROTATION |
|  | 1 | 1 |  |
|  | 0 | 1 |  |
|  | 0 | 0 |  |
|  | 1 | 0 |  |
FIG.8

METHOD AND APPARATUS FOR DETERMINING THE CENTER POSITION OF A VEHICULAR STEERING SYSTEM

BACKGROUND OF THE INVENTION

This invention relates to a method and apparatus for determining the center position of a vehicular steering system. This method and apparatus are useful for controlling a vehicular suspension system or a vehicular steering gear.

DISCLOSURE INFORMATION

Adaptive automotive suspension systems are known in the art. An example of such a system is shown in U.S. Pat. No. 4,621,833, which is assigned to the assignee of the present invention. The system of the '833 patent is described in Society of Automotive Engineers (SAE) technical paper #870540. Such adaptive suspension systems typically adjust damping force provided by one or more suspension units according to a plurality of inputs received from different sources within the vehicle. For example, it is known to control suspension units by utilizing vehicle linear acceleration, braking, steering activity, vehicle speed, predicted lateral acceleration, and other inputs.

U.S. Pat. Nos. 3,608,925, 4,345,661, 4,555,126, and 4,564,214 illustrate the use of steering inputs for the control of suspension units. A related type of control is disclosed is U.S. Pat. No. 3,895,816 in which a centrifugal force sensor and associated valving bias the vehicle to prevent excessive body roll during cornering.

Systems employing fixed steering angle sensors are prone to failure due to misadjustment of the sensor inasmuch as precise angular measurements must be obtainable from such sensors if they are to be employed in systems capable of correcting or anticipating and preventing excessive roll of an automobile body during a cornering maneuver. A related problem affects systems employing centrifugal force sensors inasmuch as such forces cannot be sensed until they exist, and once such forces have come into existence, the vehicle's body will typically have assumed an attitude which can be corrected only by an active suspension device capable of exerting force independently of its velocity of operation. Thus, to be effective, a device for providing input to a control system for operating a suspension unit should anticipate lateral acceleration rather than merely sense acceleration. U.S. Pat. No. 4,621,833 discloses a steering algorithm and method, for finding steering center, which is suitable for use in a system capable of anticipating lateral acceleration rather than merely sensing such acceleration.

The steering sensor system disclosed in U.S. Pat. No. 4,621,833 employs a software program in which steering center position is determined through the use of a fixed sample time detection scheme operating with variably sized circumferential window zones of operation of a steering shaft. Because the sampling time associated with the algorithm of U.S. Pat. No. 4,621,833 is fixed, the system disclosed therein has a limited capacity to deal with changes in steering center position, the system having a slow speed of convergence.

U.S. Pat. No. 4,722,545, also assigned to the assignee of the present invention, discloses an improvement to the steering sensor system disclosed in U.S. Pat. No. 4,621,833. The steering sensor system of U.S. Pat. No. 4,722,545 employs a software program in which the steering center position is determined through the use of a variable sampling time and variable sampling window size. The system uses a single "movable" window of operation to establish the position of the steering wheel. The system is superior to the '833 in speed of convergence. However, the algorithm may have difficulty establishing the correct center steering position when the automobile is traveling on a winding road. When the vehicle begins traversing a winding road, the system may not converge properly, resulting in the assumed center position of the steering system tracking the steering wheel.

It is an object of the present invention to provide a method and apparatus for dynamically determining the center position of a vehicular steering system.

It is yet another object of the present invention to provide a method and apparatus for determining the center position of a vehicular steering system which will rapidly determine a correct steering center position and will rapidly be able to revise a previously determined center position.

It is an advantage of the present invention that the system set forth herein utilizes a "movable" window and also includes a "fixed" window to deliver fast response to changing vehicle conditions coupled with high confidence in the determined center position.

SUMMARY OF THE INVENTION

According to the present invention, an apparatus for determining the center position of a vehicular steering system comprises a steering sensor means for sensing the position of the steering system with reference to a predetermined, but adjustable, center position and for defining two windows of operation of the steering system. The windows of operation include a first relatively movable window which generally tracks the instantaneous position of the steering system and a second relatively fixed window having a location which is resettable only after at least one time dependent condition has been satisfied. The apparatus further includes a first timer means for determining the amount of time the steering system has been operated within the movable window, as well as a second timer means for determining the amount of time a steering system operates within the fixed window. The first timer means includes means for nulling the time accumulated by the first timer means whenever the steering system is operated outside of the movable window. The second timer means includes means for suspending accumulation of time by the second timer means whenever the steering system operates outside of the fixed window.

The present invention further includes a processor means for directing the placement of the predetermined center according to the accumulation of time by either of the timer means, the processor means including positioning means for relocating the position of the predetermined center in the event that either of the timer means has accumulated a time equal to a first threshold. The processor means further comprises means for changing the value of the first threshold whenever the location of the predetermined center is adjusted as well as means for relocating the windows of operation. The processor relocates the moving window about the instantaneous location of the steering system whenever the first timer means is nulled. The processor relocates the fixed window whenever the time accumulated by either the first or second timer means is equal to the first threshold value so that the fixed window either coincides with the instantaneous position of the movable window or is centered about the instantaneous position of the steering system. The processor also resets both of the timers whenever the position of the fixed window is reset.

Furthermore, the processor changes the value of the first threshold period as a function of the magnitude of the correction of the location of the predetermined center. Preferably, the processor decreases the value of the threshold period in the event that the magnitude of the correction is greater than a preset magnitude and increases the value of the threshold in the event that the magnitude correction is less than or equal to the preset magnitude. The processor also relocates the position of the predetermined center by moving the center to a new position located between a previous position and the instantaneous position of the steering system. In a preferred embodiment, the processor relocates the position of the predetermined center by moving the center to a new position located halfway between the previous position and the instantaneous position of the steering system.

The present invention may also include a third timer means for determining the amount of time the steering system has been operated outside of the fixed window, the third timer means including means for incrementing the accumulation of time whenever the steering system is operated to one side of the fixed window and for decrementing the accumulation of time whenever the steering system is operated to the other side of the fixed window. The processor relocates the position of the predetermined center by moving the center a predetermined distance in a predetermined direction whenever the third timer means has an accumulated time value equal to a second threshold period. The processor then resets the third timer means whenever the position of the predetermined center of the steering system has been relocated.

In accordance with the present invention, a method for adjusting the center position of a vehicular steering system from a predetermined position to a new position comprises the steps of: defining two windows of operation of the steering system, the windows comprising a first relatively movable window having a location which generally tracks the instantaneous position of the steering system and a second relatively fixed window having a location which is resettable only after at least one time dependent condition has been satisfied; recording the amount of time the steering system is operated within the movable window but nulling the accumulated time whenever the steering system is operated outside of the movable window; recording the amount of time the steering system is operated within the fixed window but suspending the accumulation of time whenever the steering system is outside of the fixed window; and adjusting the position of the predetermined center to a new position whenever either of the recorded time values is equal to a first threshold period. The predetermined center is relocated by moving the center to a new position between a previous position and an instantaneous position of the steering system whenever either of the recorded time values is equal to the first threshold period. The value of the first threshold period is changed whenever the position of the predetermined center is adjusted. The method further includes the steps of moving the location of the movable window whenever the steering system is operated outside of the movable window such that the movable window extends generally about the instantaneous position of the steering system as well as moving the location of the fixed window whenever either of the recorded time values is equal to the first threshold period.

In another embodiment, the method according to the present invention further includes the step of recording the amount of time the steering system is operated outside of the fixed window and incrementing the accumulation of time when the steering system is operated to one side of the fixed window and decrementing the accumulation of time when the steering system is operated to the other side of the fixed window. When a second threshold time period is met, the predetermined center is relocated by moving the center a predetermined distance in a predetermined direction.

BRIEF DESCRIPTION OF THE DRAWINGS

FIG. 2 is an overall system block diagram in accordance with an embodiment of this invention.

FIG. 7A illustrates the output wave forms of the detectors employed in the steering sensor illustrated in FIGS. 5 and 6 for clockwise rotation.

FIG. 7B illustrates the output wave forms of the detectors employed in the steering sensor illustrated in FIGS. 5 and 6 for counterclockwise rotation.

FIG. 8 is a truth table illustrating the outputs of detectors A and B illustrated in FIGS. 5-7 as the steering sensor of the present invention is rotated counterclockwise and clockwise.

DESCRIPTION OF THE PREFERRED EMBODIMENTS

Figure 1:
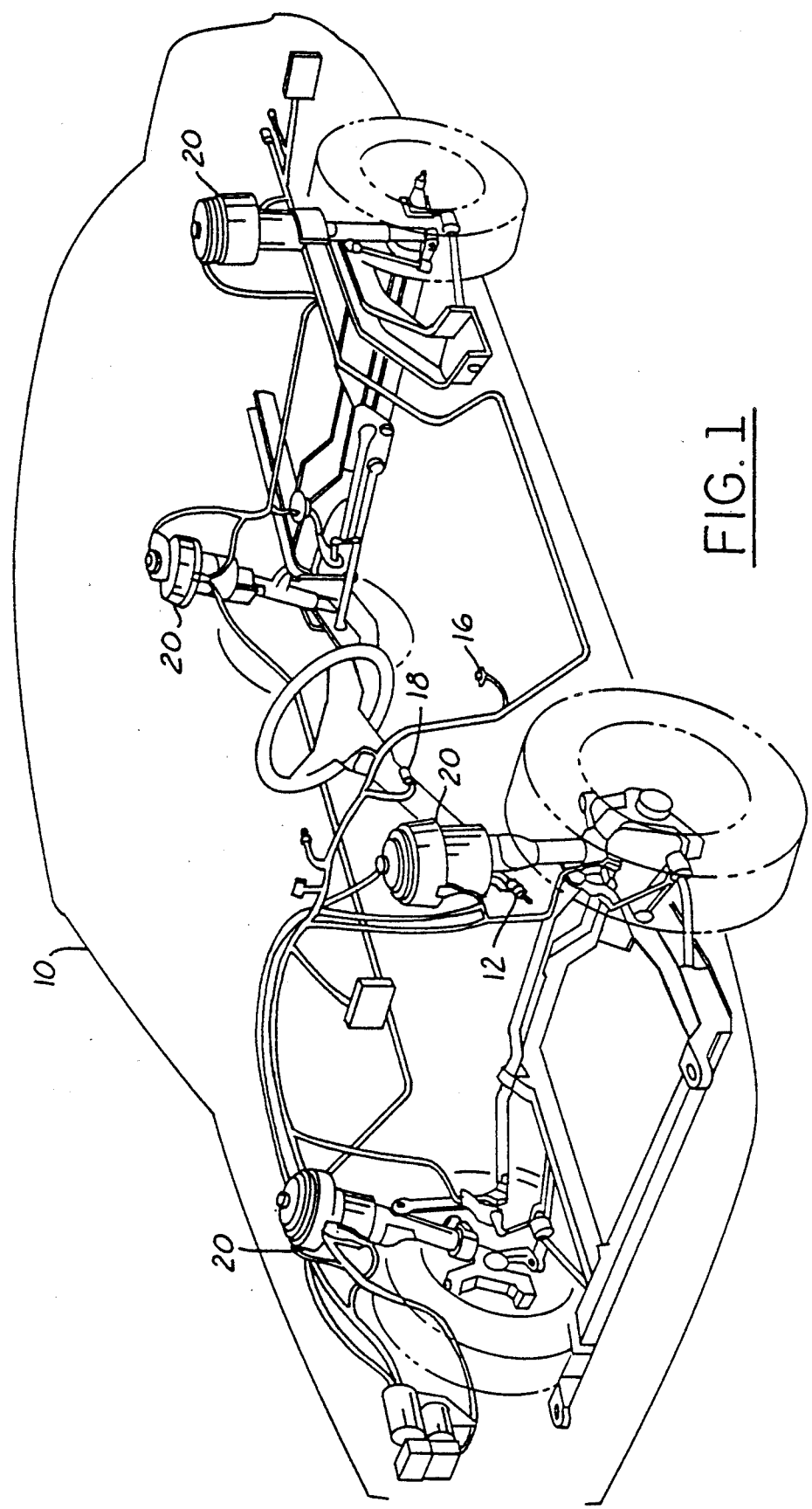
FIG. 1 is a perspective drawing of a motor vehicle incorporating the present invention. This figure shows various components of a system embodying the present invention.

As shown in FIG. 1, the method and apparatus of the present invention is intended for use with adjustable suspension units typically found in automotive vehicles. As shown in FIG. 2, the method and apparatus of the present invention is also intended for use with an adjustable steering gear.

The motor vehicle shown in FIG. 1 is equipped with adjustable front and rear suspension units 20. These suspension units are preferably constructed in a known matter such as that disclosed in U.S. Pat. No. 4,313,529, which discloses means for constructing a strut or shock absorber which is adjustable by a rotary valve positioned within one of the passageways running through the piston of the shock absorber or strut. The rotary valve functions to vary the effective cross sectional area of the passageway, thus providing an adjustable damping force. U.S. Pat. No. 4,392,540 discloses a power steering apparatus in which the amount of the steering assist provided by the power steering apparatus is responsive to vehicle speed. In the case of this invention, the amount of power assist is responsive to the instantaneous position of the steering wheel with respect to the calculated center position. The instantaneous position of the steering wheel is that position the steering system and handwheel are in at any one given instant of time. Those skilled in the art will appreciate in view of this disclosure that a system according to the present invention could be utilized to control not only adjustable suspension units and steering gears, but also other types of adjustable vehicular devices such as hydraulic crossover suspension systems, variable volume air suspension springs, or variable stabilizer bars.

The component parts of a system according to the present invention are shown in FIGS. 1 and 2. Accordingly, control module 14 receives inputs from steering sensor 12, speed sensor 16, and brake sensor 18. In return, the control module outputs commands to suspension unit operators 20 and steering gear operator 22 (FIG. 2). Those skilled in the art will appreciate in view of this disclosure that the processor within the control module and its associated peripheral equipment could be structured according to several different architectures. In a preferred embodiment, however, the processor is configured so that a control program is sequentially read for each unit command from a read-only memory (ROM) which stores preset control programs. Unit commands are executed by a central processing unit (CPU). The processor integrally includes an input-output control circuit (I/O) for exchanging data with external devices and a random access memory (RAM) for temporarily holding data while the data are being processed.

Figure 6:
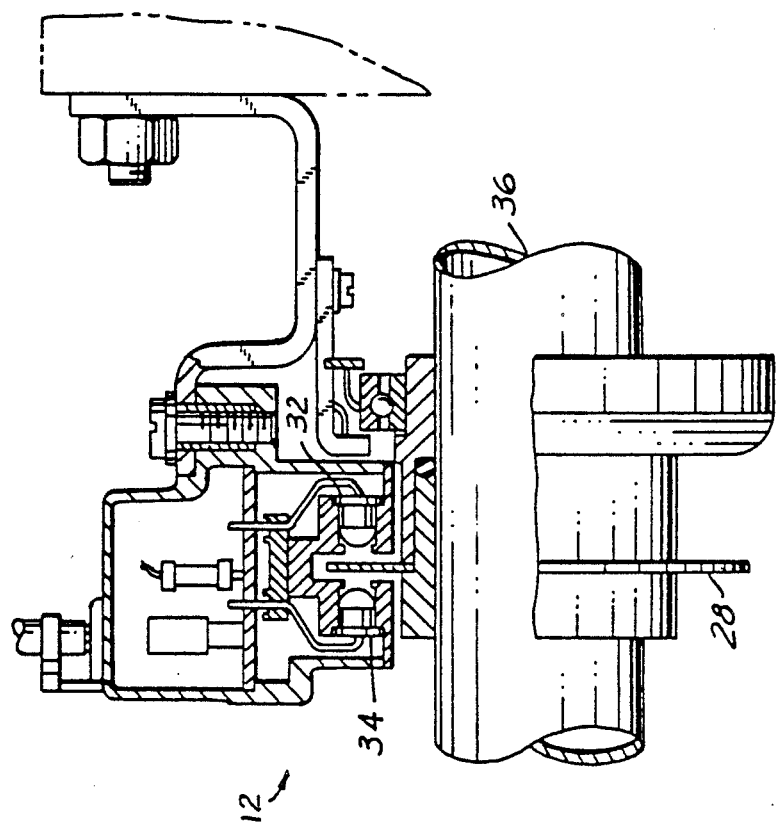
FIG. 6 is a cross sectional view of the steering sensor of the present invention taken along the line 6—6 of FIG. 5.
Figure 5:
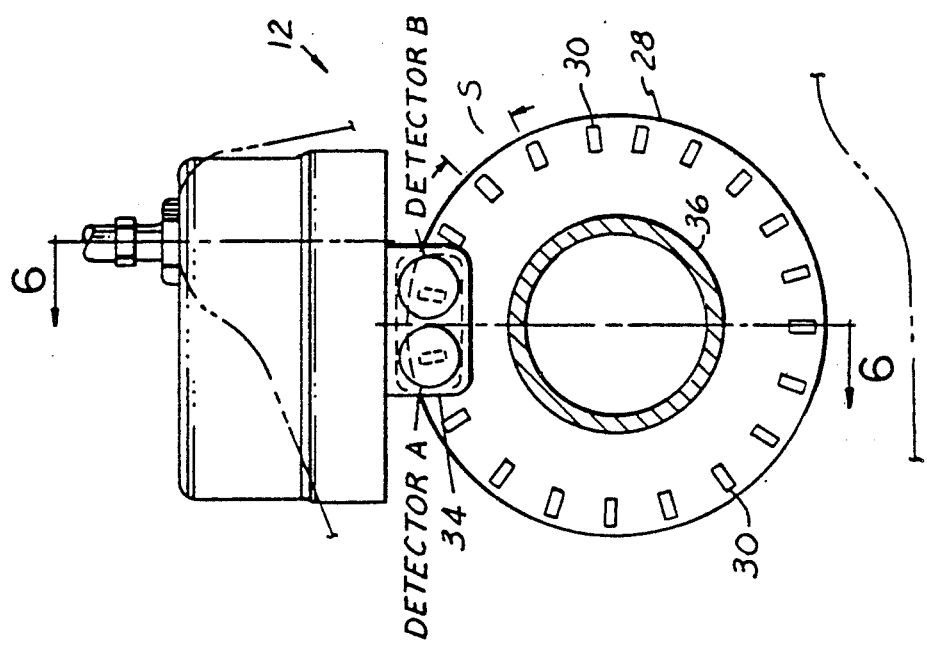
FIG. 5 is a plan view, partially cut away, of a steering sensor comprising a component part of a center finding system according to the present invention.

Steering sensor 12 includes means for measuring the excursion angle of the steering system from a center position determined by the steering sensor in conjunction with the control module as well as means, again in conjunction with the control module, for measuring the angular velocity which the steering system (e.g., the steering shaft) is being operated. Steering sensor 12 provides a portion of the information needed to predict lateral acceleration of the vehicle as disclosed in the '833 patent, the disclosure of which is hereby incorporated by reference. As shown in FIGS. 5 and 6, steering sensor 12 comprises shutter wheel 28, attached to steering shaft 36, which shaft rotates in unison with the steering wheel as the steering wheel is turned by the driver of the vehicle. Shutter wheel 28 has a plurality of apertures 30, in this case 20 in number, which apertures serve to trigger the activity of detectors A and B as the shutter wheel is rotated with the steering system of the vehicle. Because there are 20 apertures contained within shutter wheel 28, the steering sensor provides a signal 80 times during one revolution of the steering wheel and as a result each of the 80 signals or steps indicates 4.5 degrees of rotation of the steering system.

As shown in FIG. 6, each of detectors A and B includes a light emitting diode (LED) 32 and a photo diode 34. The combination of the LED and photo diode detects movement of shutter wheel 28 and, hence, the steering system. This is possible because the photo diodes have two states—i.e., they are bistable. A conducting state occurs whenever light from the paired LED passes through an aperture 30 in the shutter wheel and impinges upon the photo diode. The output of the detector circuit then rises to approximately 5 volts. A non-conducting state exists whenever the shutter wheel blocks the transmission of light between the LED and the photo diode. As shown in FIG. 7A, clockwise rotation of shutter wheel 28 produces a wave form pattern for the detectors in which detector A undergoes its transition prior to detector B. In other words, detector A leads detector B. On the other hand, as shown in FIG. 7B, counterclockwise rotation of the steering sensor produces a wave form pattern for the detectors in which detector A undergoes its transition after detector B and detector A thus lags detector B. The outputs of detectors A and B are fed into the control module and in this manner control module 14 is allowed to track the direction of the steering system's rotation.

FIG. 8 is a tabulation of the wave forms shown in FIGS. 7A and 7B in a digital format. In conventional fashion, the approximately 5 volts maximum output of the detectors is treated as a logical "1", while the zero output state is treated as a logical "0". FIG. 8 shows each of the possible logic pair states which could be output by detectors A and B. The pairs are arranged in the order in which they will be received by control module 14 for both counterclockwise and clockwise rotation. As seen in FIG. 8, counterclockwise rotation is read from the bottom of the figure to the upper part of the figure with clockwise rotation being read from the top of the tabulation to the lower part of the tabulation.

The output of detectors A and B is further processed by control module 14 to yield a signal indicating the steering system speed or angular velocity. This operation is performed quite simply by merely tracking the number of transitions of one or both detectors during a given unit of time. The number of such transitions during the sampling period will be directly proportional to the angular speed of the steering system. Those skilled in the art will appreciate in view of this disclosure that although the steering sensor described herein operates according to digital electronics principles, the present invention could be practiced through the use of other types of steering sensors such as analog electronic or other types of steering sensors.

Figure 3:
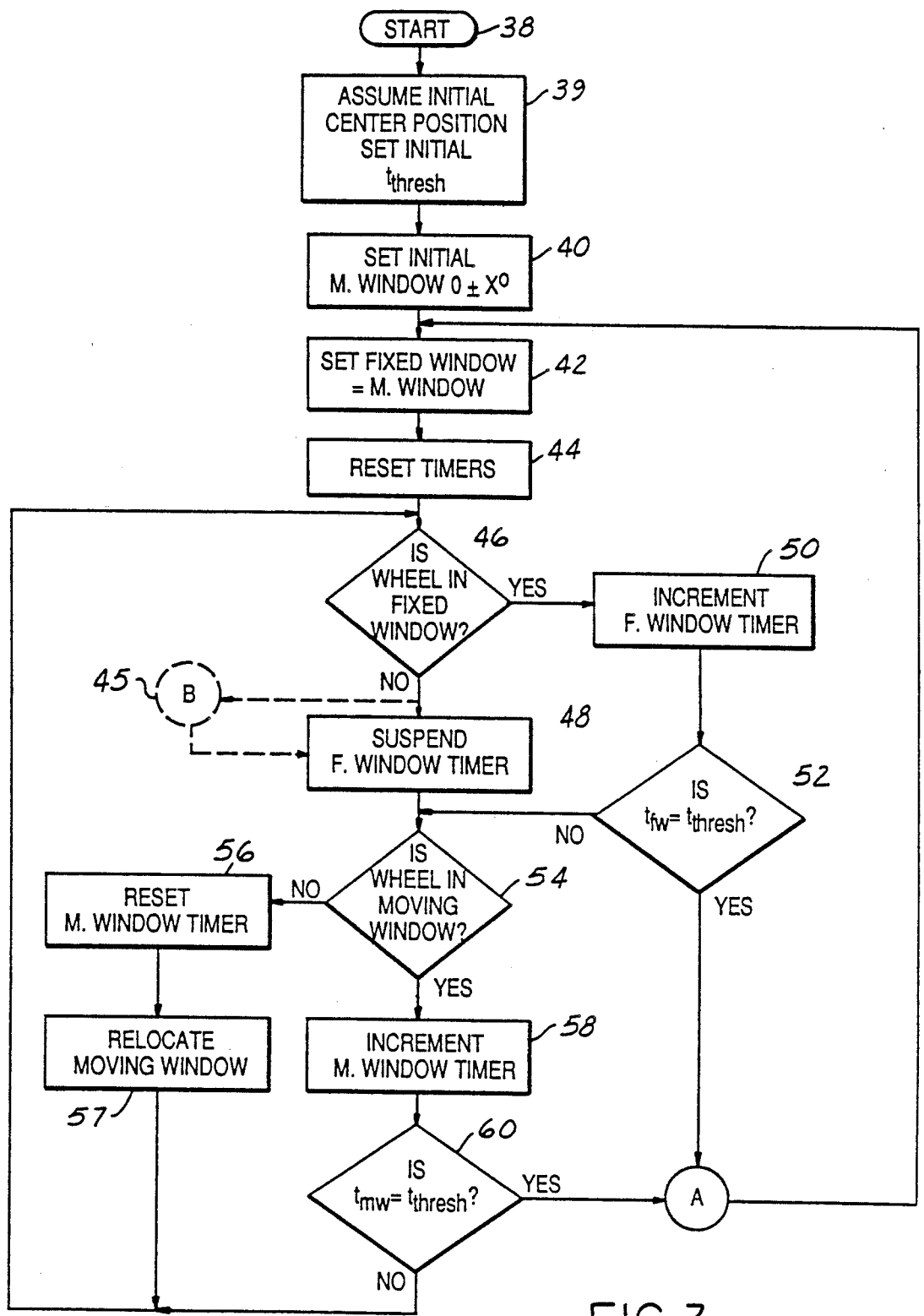
FIGS. 3 and 3A are logic flow block diagrams in accordance with the principles of the present invention.
Figure 3A:
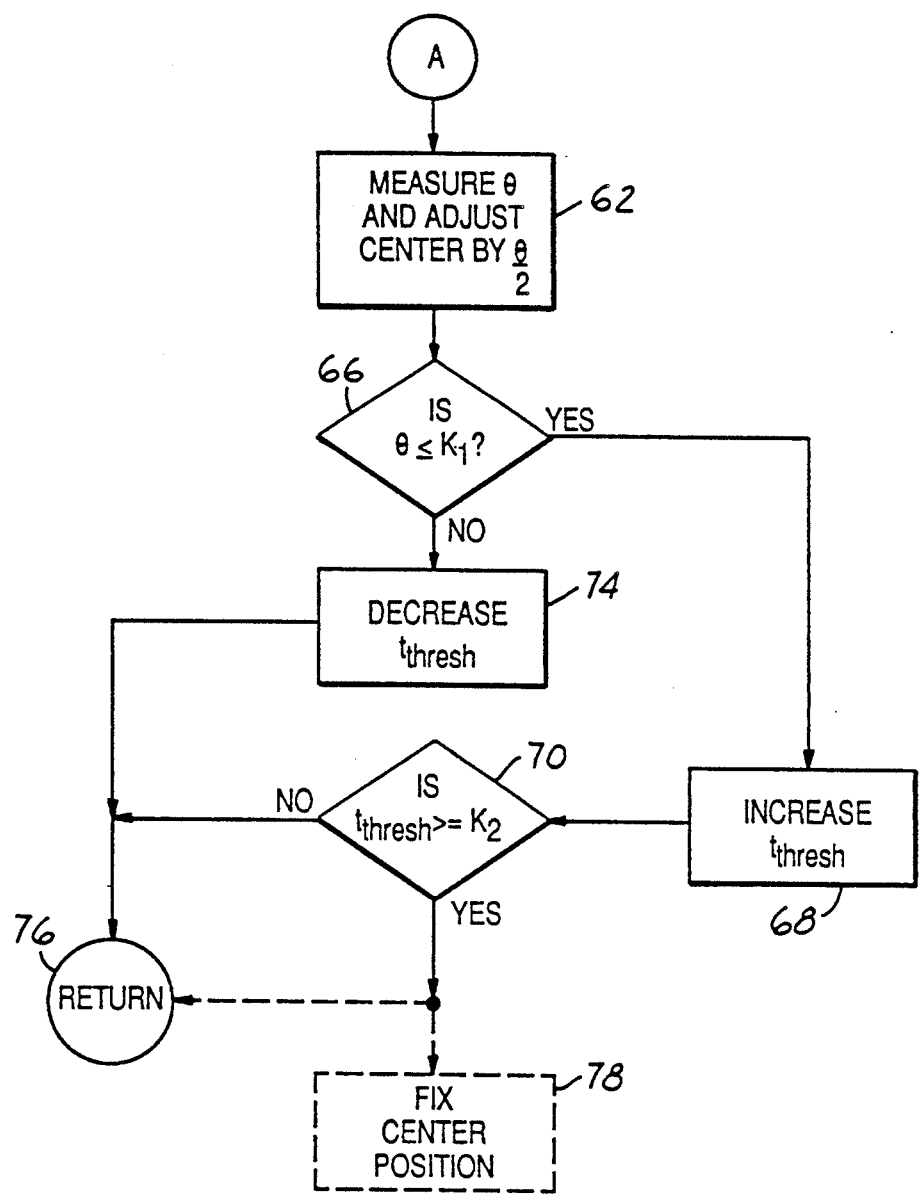
Figure 4:
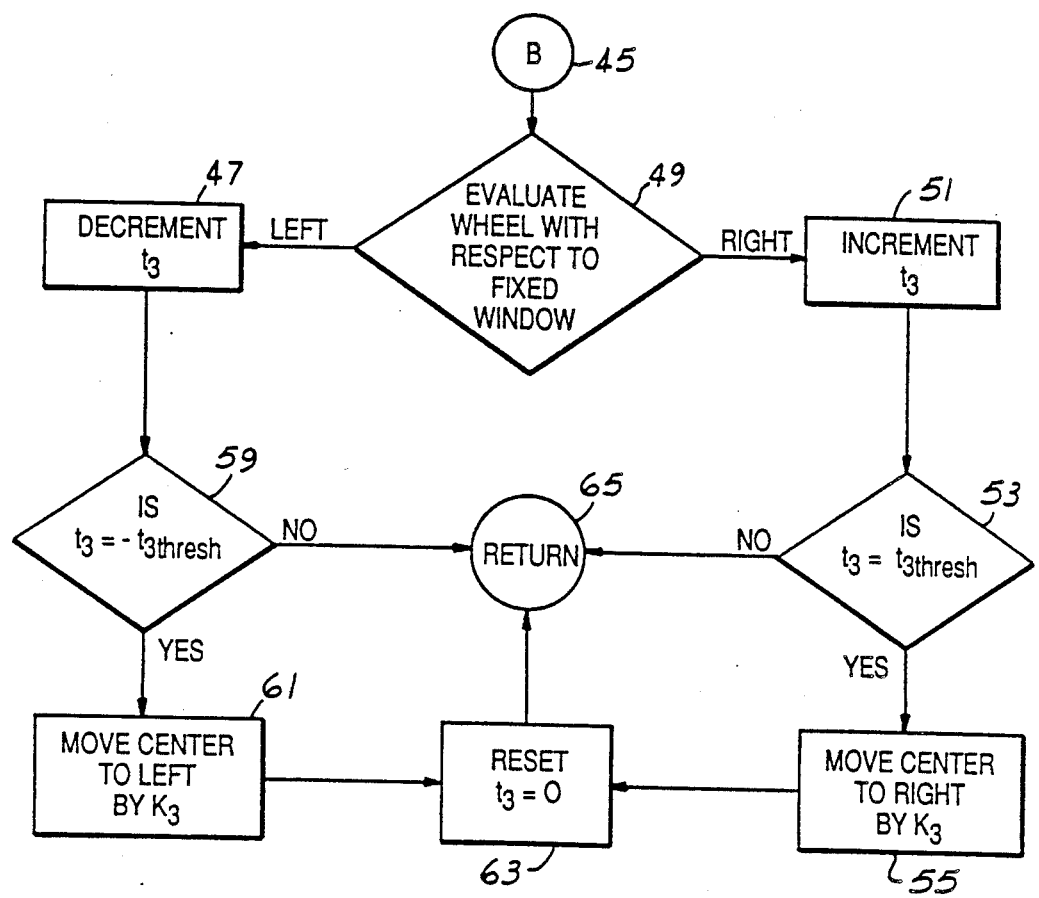
FIG. 4 is a logic flow diagram of an alternative embodiment of a system structured in accord with the principles of the present invention.

As previously noted, FIGS. 3, 3A and 4 comprise logic flow block diagrams in accordance with two embodiments of this invention. The following definition of terms are employed in FIGS. 3, 3A and 4:

$t_{mw}$ = the amount of time the steering handwheel and steering system remain within a movable window of operation;

$t_{fw}$ = the amount of time the steering handwheel and steering system remain within a fixed window of operation; and $t_{thresh}$ = threshold time; i.e., the time $t_{mw}$ and $t_{fw}$ must reach for a sample time to be taken. This value is maintained within a sampling time register.

$\Theta$ = the difference between the instantaneous steering position and adjusted or initially assumed steering center.

Beginning at start block 38 of the logic flow diagram (FIG. 3), the processor within control module 14 transfers to block 39 and assumes an initial center position as well as sets an initial $t_{thresh}$. The processor then transfers to block 40 to set a movable window of operation, and at block 42, the processor sets the location of the fixed window of operation equal to the position of the movable window. Alternatively, the fixed window may be centered around the instantaneous steering wheel position or centered about the assumed steering center. The processor then transfers to block 44 wherein a pair of window timers, one timer corresponding the movable window and the other timer corresponding to the fixed window are set equal to zero and are set into operation. The window timers measure $t_{mw}$ and $t_{fw}$, the amount of time the steering system and steering handwheel stay within either window of operation. A window of operation comprises an angular region of operation of a rotatable steering shaft. The angular region may have a predetermined, fixed size but may also be varied in accordance with the magnitude of the sampling time. In a preferred embodiment of this invention, the window size for the fixed window and the moving window is set at a fixed size of approximately 13.5 degrees but any other size window may be chosen. Alternatively, as is disclosed in U.S. Pat. No. 4,722,545, the disclosure of which is hereby incorporated by reference, the size of the moving window may be varied as a function of sampling time as disclosed therein and as will be discussed in greater detail below.

Having started to count time increments, the processor transfers to block 46 wherein a question is asked about the location of the handwheel and steering system with respect to the fixed window of operation. If the steering wheel is not within the fixed window of operation, $t_{fw}$ is suspended at block 48, but not cleared. The processor then transfers to block 54 wherein a question is asked about the location of the steering handwheel and steering system with respect to the movable window of operation as will be described later. Furthermore, as will also be described below with reference to FIG. 4, the processor may transfer to circle 45, indicated in phantom. Circle 45 represents an addition to the logic flow diagram shown in FIG. 3 for an alternative embodiment of the present invention.

If, however, the steering wheel is within the fixed window, at block 50 the processor begins incrementing the fixed window timer and at block 52 determines the equality, if any, between $t_{fw}$ and $t_{thresh}$. The reader will recall here that $t_{thresh}$ equals the sample time, or the time $t_{fw}$ must have obtained for a sample to be taken. As will be explained in greater detail below, in the event that $t_{fw} = t_{thresh}$, the processor transfers to the circled letter "A" which is only meant to illustrate the continuity between the two pages of the logic diagrams of FIGS. 3 and 3A. In the event that $t_{fw}$ is less than $t_{thresh}$ at block 52, the processor transfers to block 54 wherein a question is asked about the location of the handwheel and steering system with respect to location of the moving window. The reader will recall that the processor also arrives at block 54 if the steering wheel is not in the fixed window as explained above with regard to block 44. If, at block 54, the steering wheel is not within the movable window of operation, $t_{mw}$ is reset to zero at block 56 and the center of the movable window of operation is reset at block 57 to coincide with the instantaneous point of operation of the steering system. The processor then reiterates the algorithm beginning at block 46.

If the steering wheel is within the movable window, the processor begins to increment $t_{mw}$ at block 58, and at block 60 the processor determines the equality if any between $t_{mw}$ and $t_{thresh}$. In the event that $t_{mw}$ is less than $t_{thresh}$, the processor transfers back to block 46 wherein a question is asked about the position of the steering wheel with respect to the fixed and movable windows as explained above. If the steering wheel is still in the movable window, the processor continues to increment $t_{mw}$ until $t_m$ equals $t_{thresh}$ or the steering handwheel is no longer in the movable window. If at block 60, $t_{mw}$ is equal to $t_{thresh}$, or if at block 52 $t_{fw}$ is equal to $t_{thresh}$, the processor transfers to block 62.

At block 62, the processor measures $\Theta$, the difference between the steering system position characteristic value and the last adjusted position of the assumed center position. The steering system position characteristic value may comprise either the instantaneous steering system position, the center of the fixed window of operation of the steering system, or some other value suggested by this disclosure. Once $\Theta$ has been measured, the steering system is adjusted at block 62 by dividing the measured $\Theta$ by a factor greater than one and adjusting the center so that the newly adjusted center lies between the steering system position characteristic value and the previously adjusted center. In a preferred embodiment, $\Theta$ would be divided by two so that the newly adjusted center would lie halfway between the instantaneous center and the previously adjusted center position. Those skilled in the art will appreciate in view of this disclosure that the choice to adjust the center by moving halfway between the steering system position characteristic value and the previously adjusted center is a matter of tuning or adapting of the present invention to a given steering system.

Once the location of the adjusted center position has been set at block 62, the algorithm continues at block 66 with a comparison of $\Theta$ to a first constant, $K_1$. Thus, in block 66, if $\Theta$ is less than or equal to $K_1$, the algorithm proceeds to block 68 wherein the sampling interval $t_{thresh}$ is increased. It has been determined that normally $t_{thresh}$ should be increased by a factor greater than unity, and in a preferred embodiment, $t_{thresh}$ is doubled. Once $t_{thresh}$ is increased at block 68 the processor transfers to block 70 wherein the value of $t_{thresh}$ is compared to a second constant $K_2$. In the event that $t_{thresh}$ exceeds a predetermined time constant represented by $K_2$, that being 128 seconds in a preferred embodiment, the program will take the last adjusted center position as the correct center position at block 78 and no further adjustment will be made. It should be noted in this regard that the step of fixing the center is optional; the present invention may be practiced without this step by simply allowing the main algorithm to run as long as the vehicle is in operation.

Continuing once again with the algorithm, if the sampling or threshold interval, $t_{thresh}$ is less than time constant $K_2$, the processor will transfer to block 76 wherein a new value of $t_{thresh}$ will be entered into the main program, the fixed window of operation will assume the position of the movable window of operation and both $t_{mw}$ and $t_{fw}$ will be reset to zero such as at block 42. Returning to block 66, in the event that $\Theta$ is greater than the angle constant $K_1$, the program transfers to block 74 wherein threshold time $t_{thresh}$, is decreased. It has generally been determined that $t_{thresh}$ should be multiplied by a factor which is less than 1. For example, $t_{thresh}$ could be multiplied by one-half. Similarly, any other factor less than unity could be chosen.

As stated above, the movable window of operation may employ a fixed size or a variable size. In a preferred embodiment, the fixed size is approximately 13.5 degrees. If a variable window of operation is desired, a new value for the size of the window of operation may be calculated using the value of $t_{thresh}$, which is simplified here for the purposes of the equation as $t_s$. This may be done according to the following calculation:

$$\alpha = K_3 \frac{(INT\ 13 - Log_2 t_s)}{3}$$

Where: $K_3$ = a constant, in this case, 4.5;
INT = the integer value of the expression in brackets.
$Log_2 t_s$ = the logarithm to the base 2 of any particular value of $t_s$.

In the present system, the width of a window taken from one leading edge to a second leading edge of the shutter wheel 28 is 4.5 degrees. The equation set forth above for calculating $\alpha$ will therefore yield the following results for the following given values of $t_s$:

| $t_s$ | window size, $\alpha$ |
| --- | --- |
| ½, 1, 2 sec | 18° |
| 4, 8, 16 sec | 13.5° |
| 32, 64, 128 sec | 9° |

As seen from the table above, the window size $\alpha$ will be decreased as the sampling time $t_s$ is increased. Decreasing the size of the window allows a system according to the present invention to predict the true steering center with increased accuracy. In a similar fashion, the increase in $t_s$ which the present system provides enhances the confidence level of the predicted center. Accordingly, the present invention presents a marked improvement over the system disclosed in U.S. Pat. No. 4,621,833 because that system did not provide for variable sampling time, but utilized a fixed sampling time of variable window size. Furthermore, the present invention represents an improvement over the algorithm disclosed in the '545 patent. That system, when utilized on a vehicle which begins driving on a winding road, may not converge properly in some cases. Instead, the assuming center position would "track" the instantaneous position of the handwheel. By utilizing a fixed window in addition to a movable window, the system converges more rapidly than that of the '833 system and with a greater accuracy than that of the '545 patent. It should be noted here that the use of a variable window size according to the present invention is optional.

In another embodiment of the present invention as shown in FIG. 4, a third timer is added within the processor of the control module. The third timer monitors the amount of time that the instantaneous steering position is to either side of the fixed window. For example, if the instantaneous steering position is to the right of the fixed window, the third timer increments the accumulated time value, hereinafter denoted $t_3$, within the third timer register. If the instantaneous steering position is to the left of the fixed window, the third timer decrements the accumulated value within the register. The accumulated time value is representative of the time, in seconds, that the instantaneous steering position is outside of the fixed window. For example, a one second period to the left of the fixed window by the instantaneous steering position would be represented by a negative one in the accumulated time value, while the same amount of time to the right of the fixed window would be represented by a positive one. Obviously, other time units may be used in place of the one second intervals and the invention is not meant to be limited by that example.

Referring now to FIG. 4, there is shown that part of the logic flow diagram of FIG. 3 represented by the letter "B", encircled by phantom lines. In FIG. 4, blocks which also appear in FIG. 3 are given the same numerals as used therein. As in the FIG. 3 embodiment, the control logic diagram begins the same as before, starting at block 38. At block 38, the processor within control module 14 transfers to block 39 wherein an initial center position is assumed and an initial $t_{thresh}$ is set. The processor then transfers to block 40 wherein the movable window is set and, at block 42, the processor sets the location of the fixed window equal to the position of the movable window as described above. The processor then moves to block 44 wherein both the fixed and movable window timers as well as the third timer are set to zero so that the time values $t_{mw}$, $t_{fw}$ and $t_3$ can be monitored.

At block 46, the processor determines whether the wheel is in the fixed window. If so, $t_3$ is suspended, not cleared, and $t_{fw}$ is incremented as explained above. However, if the instantaneous steering position is not in the fixed window, $t_{fw}$ is suspended, not cleared at box 48, and the processor determines whether the instantaneous steering position is to the left or right of the fixed window at box 49 in FIG. 4. If the instantaneous steering position is to the right of the fixed window, $t_3$ is incremented at block 51 as described above. When the accumulated time value within the $t_3$ time register reaches a predetermined value, herein $t_{3\ thresh}$, as indicated by box 53, the assumed center or inferred steering center position is moved to the right by a predetermined amount, $K_3$, at box 55, that predetermined amount being 4.5 degrees in the preferred embodiment. When the assumed center position is moved 4.5 degrees, the fixed window and movable window are not moved nor are their timers reset. The $t_3$ is reset to zero after the assumed center position is moved to the right or to the left of the inferred center position and the algorithm continues. If, at block 49, the instantaneous steering position is to the left of the fixed window, the third timer decrements the $t_3$ at block 47 and the processor compares $t_3$ to another threshold value, that typically being the negative of $t_{3\ thresh}$. It is to be understood that the values for $t_{3\ thresh}$ may be chosen arbitrarily and that the values given herein are meant only as examples and not as limitations upon the practice of the present invention. If $t_3$ equals the threshold value at block 59, the inferred center steering position is moved to the left by the predetermined amount, or 4.5 degrees in the preferred embodiment. If the $t_3$ does not equal $\pm t_{3\ thresh}$ the processor returns to the algorithm as indicated at block 65.

While the processor runs the above described portion of the algorithm, if, at block 46, the steering wheel is not in the fixed window, the processor concurrently continues the algorithm at block 54 and determines whether the steering system is within the moving window as before. The processor then runs the remaining portion of the algorithm as previously described.

The additional timer in the algorithm increases the ability of the system to adjust the assumed steering position center when the confidence time is long. A long confidence there represents assurance that the system will converge upon the true steering center. The system described in the '833 patent, the '545 patent and the strategy described with respect to FIG. 3 above may not have adequate ability in certain cases to make adjustments such as can be done herein, where the confidence time is long. This enhancement also facilitates small adjustments, which are desirable because the assumed center position will be very close to the true center if confidence time is long.

The steering center position can be used as follows. First, in the event that a large value of Θ is sensed by steering sensor 12, such as when the motor vehicle is in a parking maneuver, the amount of power assist provided to the steering gear by steering gear operator 22 may be increased radically. If, however, only a small steering angle Θ is sensed, such as when the vehicle is traversing a relatively straight roadway, the amount of power assist provided to the steering gear may be reduced drastically. In the case of the adjustable suspension unit operators 20, where the steering sensor detects a suitable excursion from the adjusted center position, the suspension unit operators 20 may be directed to assume an appropriate level of damping, spring stiffness and/or vehicle height control.

The present invention thus represents a method for determining the center position of a vehicular steering system according to the steps shown in FIGS. 3, 3A and 4. Blocks 39, 40 and 42 thus correspond to the steps of assuming an initial center position and defining two windows of operation. Blocks 46 and 54 correspond to determining the position of the instantaneous steering position with respect to the windows of operation, and blocks 48, 50 and 58 correspond to the step of recording the amount of time the steering system has remained within either window of operation. In blocks 52 and 60, the recorded window times, $t_{mw}$ and $t_{fw}$, are compared to a variable threshold time $t_{thresh}$. In block 62, the difference Θ is measured between the instantaneous steering system position and the assumed center position, but only if either window times is equal to the threshold time. Block 62 corresponds to the step of adjusting the assumed center position according to the measured difference between the instantaneous steering position and the assumed steering position. Blocks 66, 68 and 74 correspond to adjusting the sampling, or threshold, time according to the measured difference between the instantaneous steering system position and the adjusted steering position. Continuing with other details of this system, at block 56, $t_w$ is set equal to zero whenever the steering system is operated outside of the movable window of operation, or whenever the movable window time is equal to the threshold time as shown by block 44. The fixed window counted time is only reset to zero whenever the fixed window is moved as in block 42.

Blocks 49, 51 and 47 correspond to the steps of recording the amount of time the steering system is operated to either side of the fixed window of operation. At blocks 53, 55, 59 and 61, the predetermined center is moved a predetermined distance in a predetermined direction based upon the accumulated time value recorded by the third timer. The accumulated time value is adjusted depending upon the position of the instantaneous steering position with respect to the fixed window.

The hardware of the present system may be described according to its functional attributes as follows. First, steering sensor 12 and its accompanying circuitry within control module 14 comprise sensor means for measuring the difference between the instantaneous position of the steering system and a previously determined center position. The sensor and associated circuitry also comprise means for defining two windows of operation. The control module includes window timers operatively connected with a steering sensor for determining the amount of time the steering system is operated within a given window. SamPling, or threshold, time registers are operatively connected with the sensor and window timers and hold appropriate threshold intervals for determining the timing of successive events in which the steering sensor measures the difference between the instantaneous position of the steering system and the previously determined center position. The processor means within the module is operatively connected with the sensor means and timers, and directs the sensor means to measure the difference between the instantaneous position of the steering system and the previously determined center position when an appropriate threshold interval has been reached. The processor then adjusts the previously determined center position based upon the measured angular difference and the threshold interval according to the magnitude of the measured difference between the instantaneous position of the steering system and the previously determined center position. The window size may be adjusted according to the size of the threshold time. The processor also adjusts the previously determined center position when a third threshold time register reaches a predetermined value.

Various modifications and variations will no doubt occur to those skilled in the arts to which this invention pertains. For example, the particular sensors used in conjunction with the disclosed system may be varied from those herein and the system may be operated according to various time constants and changes in window size and other values for the variables contained within the calculational scheme described herein. These and all other variations which basically rely on the teachings by which this disclosure has advanced the art are properly considered within the scope of this invention as defined by the appended claims.

I claim:

1. An apparatus for determining the center position of a vehicular steering system, comprising:

steering sensor means for sensing the position of said steering system with reference to a predetermined, but adjustable, center position and for defining two windows of operation of said steering system, said windows comprising a first relatively movable window which generally tracks the instantaneous position of said steering system and a second relatively fixed window having a location which is resettable only after at least one time dependent condition has been satisfied;

first timer means for determining the amount of time said steering system has been operated within said movable window, with said first timer means including means for nulling the time accumulated by said first timer means whenever said steering system is operated outside of said movable window;

second timer means for determining the amount of time said steering system has been operated within said fixed window, with said second timer means including means for suspending the accumulation of time by said second timer means whenever said steering system is operated outside of said fixed window; and processor means for directing the placement of said predetermined center according to the accumulation of time by either of said timer means, with said processor means comprising positioning means for relocating the position of said predetermined center in the event that either of said timer means has accumulated time equal to a threshold period.

2. An apparatus according to claim 1, wherein said processor means further comprises means for changing the value of said threshold period whenever the location of said predetermined center is adjusted.

3. An apparatus according to claim 1, wherein said processor means further comprises means for relocating said windows.

4. An apparatus according to claim 3, wherein said processor relocates said moving window whenever said first timer means is nulled.

5. An apparatus according to claim 4, wherein said processor relocates said moving window about the instantaneous location of said steering system whenever said first timer means is nulled.

6. An apparatus according to claim 3, wherein said processor relocates said fixed window whenever the time accumulated by either of said timer means is equal to said threshold period.

7. An apparatus according to claim 6, wherein said processor relocates said fixed window to coincide with the instantaneous position of said movable window.

8. An apparatus according to claim 6, wherein said processor relocates said fixed window such that said fixed window is centered about said instantaneous position of said steering system.

9. An apparatus according to claim 6 wherein said processor resets both of said timer means whenever the position of said fixed window is reset.

10. An apparatus according to claim 1 wherein said processor changes the value of said threshold period as a function of the magnitude of the correction of the location of said predetermined center.

11. An apparatus according to claim 10 wherein said processor: (i) decreases the value of said threshold period in the event that the magnitude of said correction is greater than a preset magnitude and (ii) increases the value of said threshold period in the event that the magnitude of said correction is less than or equal to said preset magnitude.

12. An apparatus according to claim 1 wherein said processor relocates the position of said predetermined center by moving said center to a new position located between a previous position and said instantaneous position of the steering system.

13. An apparatus according to claim 12 wherein said processor relocates the position of said predetermined center by moving said center to a new position located halfway between the immediately previous position and the instantaneous position of the steering system.

14. An apparatus according to claim 1, further including a third timer means for determining the amount of time said steering system has been operated outside of said fixed window, said third timer means including means for incrementing the accumulation of time by said third timer means whenever said steering system is operated to one side of said fixed window and for decrementing the accumulation of time by said third timer means whenever said steering system is operated to the other side of said fixed window.

15. An apparatus according to claim 14, wherein said processor relocates the position of said predetermined center by moving said center a predetermined distance in a predetermined direction whenever said third timer means has accumulated time equal to a second threshold period.

16. An apparatus according to claim 14, wherein said processor resets said third timer means whenever the position of said predetermined center of said steering system is relocated.

17. An apparatus for determining the center position of a vehicular steering system, comprising:
   steering sensor means for sensing the position of said steering system with reference to a predetermined, but adjustable, center position and for defining two windows of operation of said steering system, said windows comprising a first relatively movable window which generally tracks the instantaneous position of said steering system and a second relatively fixed window having a location which is resettable only after at least one time dependent condition has been satisfied;
   first timer means for determining the amount of time said steering system has been operated within said first movable window, with said first timer means including means for nulling the time accumulated by said first timer means whenever said steering system is operated outside of said movable window;
   second timer means for determining the amount of time said steering system has been operated within said fixed window, said second timer means including means for suspending the accumulation of time by said second timer means whenever said steering system is operated outside of said fixed window;
   third timer means for determining the amount of time said steering system has been operated outside of said fixed window, with said third timer means including means for incrementing the accumulation of time by said third timer means whenever said steering system is operated to one side of said fixed window and for decrementing the accumulation of time by said third timer means whenever said steering system is operated to the other side of said fixed window; and
   processor means for directing the placement of said predetermined center and said windows according to the accumulation of time by each of said timer means, with said processor means comprising:
      positioning means for relocating the position of said predetermined center in the event that either said first or second timer means has accumulated time equal to a first threshold period or said third timer means has accumulated time equal to a second threshold period;
      means for changing the value of said first threshold period whenever the location of said predetermined center is adjusted;
      means for relocating said moving window about the instantaneous location of said steering system whenever said first timer means is nulled; and
      means for relocating said fixed window whenever the time accumulated by either of said first or second timer means is equal to said first threshold period.

18. An apparatus according to claim 17, wherein said processor relocates said fixed window to coincide with the instantaneous position of said movable window.

19. An apparatus according to claim 17 wherein said processor changes the value of said first threshold period as a function of the magnitude of the correction of the location of said predetermined center.

20. An apparatus as in claim 17, wherein said processor relocates the position of said predetermined center by moving said center a predetermined distance in a predetermined direction whenever said third timer means has accumulated time equal to a second threshold period.

21. A method for adjusting the center position of a vehicular steering system from a predetermined position to a new position, comprising the steps of:
- defining two windows of operation of said steering system, said windows comprising a first relatively movable window having a location which generally tracks the instantaneous position of said steering system and a second relatively fixed window having a location which is resettable only after at least one time dependent condition has been satisfied;
- recording the amount of time said steering system is operated within said movable window, but nulling the accumulated time whenever said steering system is operated outside of said movable window;
- recording the amount of time said steering system is operated within said fixed window, but suspending the accumulation of time whenever said steering system is operated outside of said fixed window; and
- adjusting the position of said predetermined center to a new position whenever either of the recorded time values is equal to a first threshold period.

22. A method according to claim 21, wherein said predetermined center is relocated by moving said center to a new position located between a previous position and the instantaneous position of said steering system.

23. A method according to claim 21, wherein the value of said first threshold period is changed whenever the position of said predetermined center is adjusted.

24. A method according to claim 21, wherein the location of said movable window is changed whenever said steering system is operated outside of said movable window.

25. A method according to claim 24, wherein the location of said movable window is reset so that said movable window extends generally about the instantaneous position of said steering system.

26. A method according to claim 21, wherein the location of said fixed window is changed whenever either of the recorded time values is equal to said first threshold period.

27. A method according to claim 21, further including the step of recording the amount of time said steering system is operated outside of said fixed window, and incrementing the accumulation of time when said steering system is operated to one side of said fixed window and decrementing the accumulation of time when the steering system is operated to the other side of said fixed window.

28. A method according to claim 27, wherein said predetermined center is relocated by moving said center a predetermined distance in a predetermined direction whenever the recorded time value that said steering system is operated outside of said fixed window exceeds a second threshold value.

29. In a vehicle including a multistable suspension unit having a plurality of predetermined operating states and a power assisted steering mechanism, a system for determining the center position of a vehicular steering system, comprising:
- steering sensor means for sensing the position of said steering system with reference to a predetermined, but adjustable, center position and for defining two windows of operation of said steering system, said windows comprising a first relatively movable window which generally tracks the instantaneous position of said steering system and a second relatively fixed window having a location which is resettable only after at least one time dependent condition has been satisfied;
- first timer means for determining the amount of time said steering system has been operated within said first movable window, with said first timer means including means for nulling the time accumulated by said first timer means whenever said steering system is operated outside of said movable window;
- second timer means for determining the amount of time said steering system has been operated within said fixed window, said second timer means including means for suspending the accumulation of time by said second timer means whenever said steering system is operated outside of said fixed window;
- third timer means for determining the amount of time said steering system has been operated outside of said fixed window, with said third timer means including means for incrementing the accumulation of time by said third timer means whenever said steering system is operated to one side of said fixed window and for decrementing the accumulation of time by said third timer means whenever said steering system is operated to the other side of said fixed window; and
- processor means for directing the placement of said predetermined center and said windows according to the accumulation of time by each of said timer means, with said processor means comprising:
  - positioning means for relocating the position of said predetermined center in the event that either said first or second timer means has accumulated time equal to a first threshold period or said third timer means has accumulated time equal to a second threshold period;
  - means for changing the value of said first threshold period whenever the location of said predetermined center is adjusted;
  - means for relocating said moving window about the instantaneous location of said steering system whenever said first timer means is nulled; and
  - means for relocating said fixed window whenever the time accumulated by either of said first or second timer means is equal to said first threshold period.

* * * * *